Patented Oct. 25, 1949

2,486,318

UNITED STATES PATENT OFFICE 2,486,318

PURIFICATION OF SOLUTIONS

James W. Newsome, Belleville, and John W. Van Cleve, East St. Louis, Ill., assignors to Aluminum Company of America, Pittsburgh, Pa., a corporation of Pennsylvania No Drawing. Application May 18, 1946, Serial No. 670,828

2 Claims. (Cl. 23—63)

This invention relates to the purification of solutions containing dissolved sodium carbonate, and relates particularly to the removal of dissolved sodium sulphate from such solutions.

It is possible to lower the concentration of sodium sulphate in aqueous sodium carbonate solutions by increasing the concentration of sodium carbonate in the solution, as by evaporation of water from the solution, to such an extent that burkeite ($Na_2CO_3.2Na_2SO_4$) precipitates from the solution. However, that procedure involves the loss of sodium carbonate values from the solution in the precipitate produced.

It is an object of this invention to provide a method for removing alkali metal sulphate from solutions containing dissolved sodium carbonate, and it is particularly an object of the invention to provide such a method in which loss of sodium carbonate values from the solution is minimized or avoided. It is a further object of this invention to provide a method of precipitating sodium sulphate values from aqueous solutions containing dissolved sodium carbonate by evaporating water from the solution sufficiently for such precipitation to occur, but which involves less evaporation than is required to effect precipitation of the sodium sulphate from the solution as burkeite.

We have discovered that sodium sulphate can be removed from solutions containing that compound and sodium carbonate by precipitating sodium sulphate values from the solution in the form of schairerite ($Na_2SO_4.NaF$), and that such precipitation can be effected by reaction of the sodium sulphate with sodium fluoride when the concentration of dissolved sodium sulphate in the solution is insufficient for burkeite to precipitate from the solution. Thus, if sodium fluoride is dissolved in an aqueous solution containing dissolved sodium sulphate and sodium carbonate, followed by concentration of the solution by evaporation of water therefrom, schairerite is precipitated from the solution before the solution reaches a concentration at which burkeite would have begun to precipitate if the sodium fluoride had not been added. The schairerite precipitated can be readily separated from the solution by filtration or settling.

By precipitating the necessary amount of sodium sulphate from the solution as schairerite, and thus rendering that amount of sodium sulphate unavailable for the formation of burkeite upon further concentration of the solution, it becomes possible to concentrate the solution to any desired extent with precipitating burkeite. Hence, by means of this invention, when it is desired to concentrate a solution by evaporation which contains sufficient dissolved sodium sulphate and sodium carbonate that burkeite would ordinarily precipitate upon the evaporation of the desired amount of solvent, it is possible to evaporate that same amount of solvent without causing burkeite to precipitate; it is merely necessary to precipitate enough of the sodium sulphate as schairerite in the manner described above to keep the concentration of dissolved sodium sulphate in the solution from reaching a point at which burkeite will precipitate from the solution as the solvent evaporates.

The amount of sodium fluoride to be added to the solution depends upon the amount of sodium sulphate which is to be removed from the solution as schairerite. At least the stoichiometric amount required for combination with that amount of sodium sulphate as schairerite should be employed, i. e., a molecular ratio of sodium fluoride to sodium sulphate to be removed of at least 1 to 1. Instead of adding sodium fluoride to the solution as such, it may be formed in the solution, as by reaction of a material containing fluorine ions with another substance present. For example, by adding ammonium fluoride, hydrofluoric acid, or cryolite to the solution for reaction with a sodium compound present, such as sodium hydroxide, sodium fluoride can be made available for the formation of schairerite.

The procedure described above is especially valuable in connection with the recovery of alumina from bauxite and the like by processes involving the formation of an aqueous sodium aluminate solution containing dissolved sodium carbonate, in instances where the solution becomes contaminated with sodium sulphate. For example, when bauxite is sintered with soda ash and limestone, sulphides in the bauxite are converted to sodium sulphate, and additional sodium sulphate may form if the sintering operation is carried out by passing hot sulphur-bearing gas through or over the bauxite-soda ash-limestone mixture. When the sintered material is leached to dissolve the sodium aluminate and excess sodium carbonate present, sodium sulphate present likewise dissolves in the solution. If the leach liquid is reused repeatedly in leaching sintered material, as where a cyclic process is employed in which aluminum hydrate is precipitated from the solution after the leaching operation, and the "spent" solution is then used in leaching additional sintered material, the amount of sodium sulphate in the solution keeps increasing with each leaching operation and eventually becomes undesirably high for proper operation of the system. Thus, removal of sodium sulphate from the solution becomes desirable.

Such removal can be effected conveniently in accordance with this invention by adding the appropriate amount of sodium fluoride to the solution and then evaporating water therefrom until the desired amount of sodium sulphate has been precipitated from the solution as schairerite, after which the schairerite can be separated from the solution. By that procedure, the concentration of the dissolved sodium sulphate in the solution can be reduced to whatever extent is desired, and without precipitation of burkeite from the solution, even though in the course of the process sufficient water be evaporated from the solution that burkeite would precipitate if the schairerite had not been formed.

Some of the advantages of the invention will be apparent from the following example: To an aqueous solution containing 80 grams per liter of sodium carbonate, 30 grams per liter of sodium sulphate, 69 grams per liter of sodium aluminate and 71 grams per liter of sodium hydroxide dissolved therein, was added 9 grams per liter of sodium fluoride. The solution was then boiled to drive off water. Evaporation of only 130 cc. of water per liter of solution was required to lower the sodium sulphate content of the solution to 20 grams per liter, the other 10 grams per liter being precipitated as schairerite; evaporation of 400 cc. of water per liter resulted in 80 per cent of the sodium sulphate originally present being precipitated as schairerite, the balance of the sodium sulphate remaining in solution. On the other hand, with the same initial solution to which no sodium fluoride was added, evaporation of 440 cc. of water per liter of solution was required to lower the dissolved sodium sulphate content of the solution by 10 grams per liter by precipitation of burkeite; and evaporation of only 400 cc. of water from the solution failed to precipitate any of the sodium sulphate values in the solution.

We claim:

1. A method of treating an aqueous solution containing dissolved sodium sulphate and sodium carbonate, comprising dissolving sodium fluoride in the said solution, and thereafter concentrating said solution by evaporation of water therefrom sufficiently for schairerite ($Na_2SO_4 \cdot NaF$) to precipitate from the solution but insufficiently for precipitation of burkeite from the solution, and subsequently evaporating sufficient water from the solution that sodium sulphate values precipitated in the said schairerite would have precipitated as burkeite if the schairerite had not been precipitated.

2. A method of treating an aqueous solution containing dissolved sodium sulfate, sodium aluminate and sodium carbonate, comprising dissolving sodium fluoride in the said solution and thereafter concentrating the solution by evaporation of water therefrom sufficiently for schairerite ($Na_2SO_4 \cdot NaF$) to precipitate from the solution but insufficiently for precipitation of burkeite from the solution, and subsequently evaporating sufficient water from the solution that sodium sulfate values precipitated in the said schairerite would have precipitated as burkeite if the schairerite had not been precipitated.

JAMES W. NEWSOME.
JOHN W. VAN CLEVE.

REFERENCES CITED

The following references are of record in the file of this patent:

Schairerite, A New Mineral Found in Seales Lake, California, American Minerals, vol. 16 (1931), pp. 133–9.